(12) United States Patent
Hwang

(10) Patent No.: US 9,348,432 B2
(45) Date of Patent: May 24, 2016

(54) TRANSMITTANCE BASED SENSOR

(71) Applicant: KOREA ADVANCED INSTITUTE OF SCIENCE AND TECHNOLOGY, Daejeon (KR)

(72) Inventor: Sung Jae Hwang, Daejeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 386 days.

(21) Appl. No.: 13/854,244

(22) Filed: Apr. 1, 2013

(65) Prior Publication Data
US 2014/0078041 A1    Mar. 20, 2014

(30) Foreign Application Priority Data

Sep. 18, 2012 (KR) .................. 10-2012-0103450

(51) Int. Cl.
*G06F 3/042* (2006.01)
*G06F 3/03* (2006.01)

(52) U.S. Cl.
CPC ............ *G06F 3/0304* (2013.01); *G06F 3/0425* (2013.01)

(58) Field of Classification Search
None
See application file for complete search history.

(56) References Cited

U.S. PATENT DOCUMENTS

| 2009/0312654 | A1* | 12/2009 | Kasama ............... G06F 3/042 600/500 |
| 2011/0102319 | A1* | 5/2011 | Lin ..................... G06F 3/03543 345/158 |
| 2011/0239166 | A1* | 9/2011 | Choi .......................... 715/863 |
| 2014/0132564 | A1* | 5/2014 | Tapley et al. ................ 345/175 |

FOREIGN PATENT DOCUMENTS

| JP | 4796104 | 8/2011 |
| KR | 1020090127544 | 12/2009 |
| KR | 101117289 | 2/2012 |
| KR | 1020120050695 | 5/2012 |

* cited by examiner

*Primary Examiner* — Adam R Giesy
(74) *Attorney, Agent, or Firm* — Cantor Colburn LLP

(57) ABSTRACT

A device may include an image sensor configured to capture an image of an object in front of the image sensor, an image analyzer configured to analyze the captured image to calculate a transmittance of a light that is transmitted from outside of the object to the image sensor via the object, a command mapper configured to translate the transmittance into a command, and an executor configured to execute the command.

20 Claims, 10 Drawing Sheets

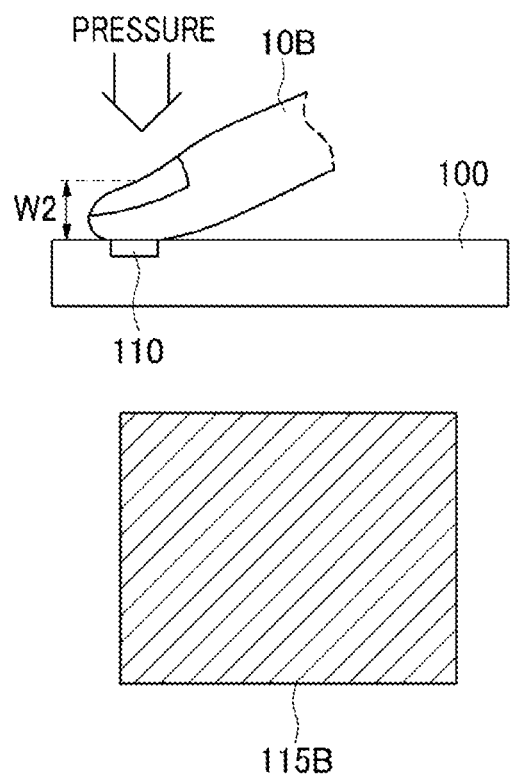

L ← → R

TRANSMITTANCE BASED SENSOR

CROSS-REFERENCE TO RELATED PATENT APPLICATION

This application claims priority from the Korean Patent Application No. 10-2012-0103450, filed on Sep. 18, 2012 in the Korean Intellectual Property Office, the entire disclosure of which is incorporated herein by reference in its entirety.

FIELD

Example embodiments broadly relate to a technology that utilizes a transmittance of a light calculated based on an image captured by an image sensor.

BACKGROUND

An electronic device such as a smart phone, a smart pad or a notebook computer generally has a camera function in addition to other functions such as a voice/video call, internet browsing, audio/video reproduction, and so forth. The camera function is performed by an image sensor included in the electronic device and photos taken by the image sensor can be stored in a memory of the electronic device. Then, the photos stored in the memory can be shared by an e-mail, a multimedia message service or a social network service. Typically, the various functions executable by the electronic device are controlled by pressing a GUI (Graphical User Interface) shown on a touch screen of the electronic device or a physical button mounted on the electronic device.

SUMMARY

According to an aspect of example embodiments, there is provided a device including an image sensor configured to capture an image of an object in front of the image sensor, an image analyzer configured to analyze the captured image to calculate a transmittance of a light that is transmitted from outside of the object to the image sensor via the object, a command mapper configured to translate the transmittance into a command, and an executor configured to execute the command.

The image analyzer may be further configured to analyze the captured image to calculate a distribution of transmittances of the light, and the command mapper may be further configured to translate the distribution of transmittances into a command.

The image sensor may be further configured to capture a plurality of images of the object, and the image analyzer may be further configured to analyze the captured images to detect a movement of the object by calculating a change in distributions of transmittances of the light, and the command mapper may be further configured to translate the change in the distributions of transmittances into a command.

The object may be a finger pressing a front surface of the image sensor.

The object may be an elastically deformable body that is attached on a surface of the device to cover the image sensor.

The image analyzer may be further configured to analyze a predetermined part of pixels from the captured image without analyzing the rest pixels from the captured image.

The image sensor may be further configured to capture the image of the object at regular time intervals.

The image analyzer may be further configured to compensate the transmittance based, at least in part, on a color of the object.

The image analyzer may be further configured to compensate the transmittance based, at least in part, on a pulse detected from the finger.

The command may include at least one of unlocking of the device, stopping a function of the device, and turning up/down a volume of the device.

The command may be programmable by a user of the device.

The device may further include a light emitter configured to emit the light that travels through the object.

The light may be emitted from a display of the device.

According to another aspect of example embodiments, a pressure sensor includes an image sensor configured to capture an image of an object in front of the image sensor, an image analyzer configured to analyze the captured image to calculate a transmittance of a light that is transmitted from outside of the object to the image sensor via the object, and a pressure calculator configured to calculate a pressure applied to the object based, at least in part, on the transmittance.

The image analyzer may be further configured to analyze the captured image to calculate a distribution of transmittances of the light, and the pressure calculator may be further configured to determine a direction of the pressure based, at least in part, on the distribution of transmittances.

The image sensor may be further configured to capture a plurality of images of the object, and the image analyzer may be further configured to analyze the captured images to calculate a change in distributions of transmittances of the light, and the pressure calculator may be further configured to determine a dynamic pattern of the pressure based, at least in part, on the change in distributions of transmittances.

The image analyzer may be further configured to analyze a predetermined part of pixels from the captured image without analyzing the rest pixels from the captured image.

The image sensor may be further configured to capture the image of the object at regular time intervals.

According to still another aspect of example embodiments, a method performed by a device includes capturing an image of an object in front of the device, analyzing the captured image to calculate a transmittance of a light that travels through the object to the device, translating the transmittance into a command, and executing the command.

According to still another aspect of example embodiments, there is provided a non-transitory computer-readable storage medium having stored thereon computer-executable instructions that, in response to execution, cause a device to perform a method including capturing an image of an object in front of the device, analyzing the captured image to calculate a transmittance of a light that travels through the object to the device, translating the transmittance into a command, and executing the command.

BRIEF DESCRIPTION OF THE DRAWINGS

Non-limiting and non-exhaustive example embodiments will be described in conjunction with the accompanying drawings. Understanding that these drawings depict only example embodiments and are, therefore, not intended to limit its scope, the example embodiments will be described with specificity and detail taken in conjunction with the accompanying drawings, in which:

FIGS. 2A to 2B schematically show an illustrative example of captured images in accordance with at least some embodiments described herein;

DETAILED DESCRIPTION

Figure 1:
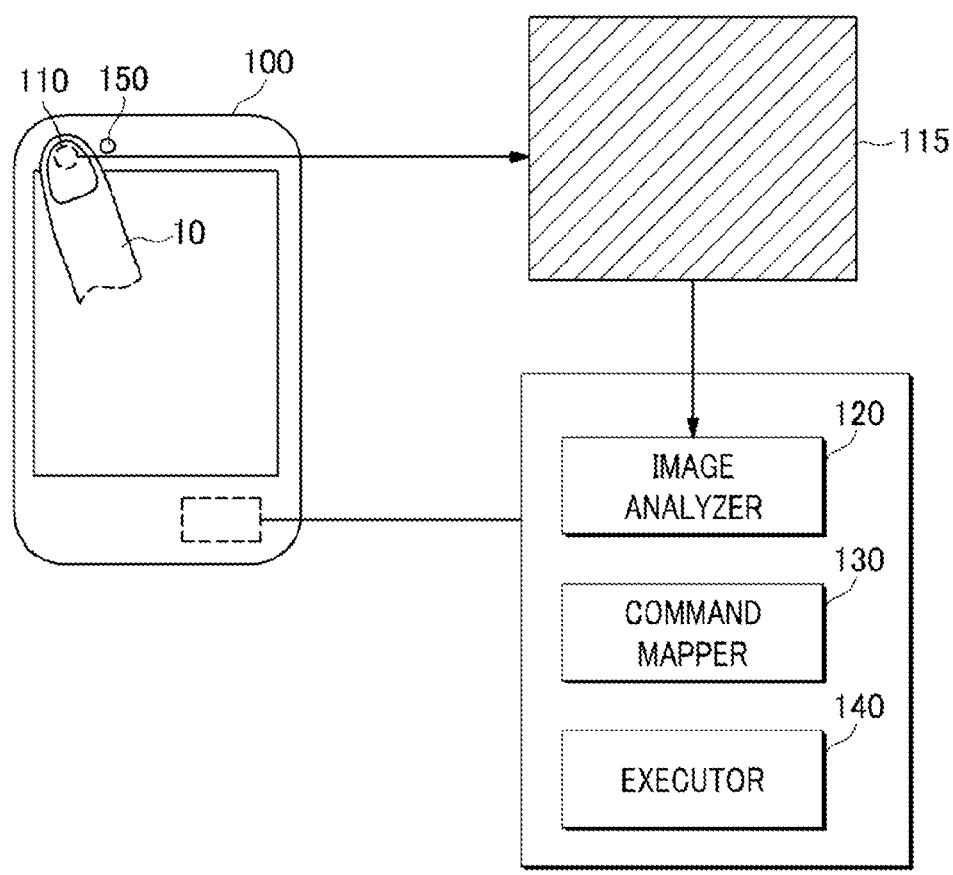
FIG. 1 shows a schematic block diagram illustrating an architecture of a device in accordance with example embodiments described herein.

Hereinafter, some embodiments will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the provision of functional blocks in the drawings is intended to give a clear understanding of the various functions performed, but is not to be construed as indicating that the corresponding functions are necessarily implemented in physically separate entities.

It is further to be understood that any connection which is described as being wire-based in the following specification may also be implemented as a wireless communication connection unless noted to the contrary.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

In some examples, an image sensor mounted on or coupled with an electronic device may capture an image of an object that is located in front of the image sensor. The object may be a light-transmittable elastic body such as a human finger. The electronic device may analyze the captured image to calculate a transmittance of a light that travels through the object from outside of the object to the image sensor, and then translate the transmittance into a command to execute the translated command. In this way, a user may control the electronic device by pressing the object on the image sensor of the electronic device.

FIG. 1 shows a schematic block diagram illustrating an architecture of a device in accordance with example embodiments described herein. As depicted in FIG. 1, a device 100 may include an image sensor 110, an image analyzer 120, a command mapper 130, an executor 140, and a light emitter 150. Although illustrated as discrete components, various components may be divided into additional components, combined into fewer components, or eliminated altogether while being contemplated within the scope of the disclosed subject matter.

Image sensor 110 may be included in or connected to device 100. Image sensor 110 may be an array image sensor such as a charge-coupled device (CCD) image sensor and a complementary metal-oxide-semiconductor (CMOS) sensor. For example, a camera component built in device 100 can be used as image sensor 110.

Image sensor 110 may capture an image 115 of an object that is positioned in front of image sensor 110. Referring to FIGS. 1 to 4, the object may be, but not limited to, a finger 10 (10A to 10D) that is pressing or covering a front surface of image sensor 110.

In some embodiments, image sensor 110 may be activated all the time to capture an image of finger 10 in front of image sensor 110. In other embodiments, in order to reduce power consumption of a battery of device 100, image sensor 110 may capture an image of finger 10 at regular time intervals. In other embodiments, only a part of image sensor 110 may be activated to capture an image of finger 10 in order to further reduce the power consumption of the battery of device 100.

Although image sensor 110 in FIG. 1 is illustrated to be located on the front face of device 100, image sensor 110 may be mounted on the back face of device 100 such that a user can easily touch image sensor 110 with finger 10 of the same hand that is holding device 100. A position of image sensor 110 is not limited to a specific position of device 100.

Captured image 115 may include a partial image of finger 10 that is covering or pressing image sensor 110. From captured image 115, luminances of respective pixels can be detected. In captured image 115, some pixels may have the same luminances and some pixels may have different luminances. Thus, an average luminance or a distribution of the luminances of pixels may be calculated from captured image 115.

Image analyzer 120 may analyze captured image 115 to calculate a transmittance of a light that is transmitted from the outside of finger 10 to image sensor 110 via finger 10. By way of example, if a pixel in captured image 115 has a high luminance, the pixel may have a high transmittance. Similarly, if a pixel in captured image 115 has a low luminance, the pixel may have a low transmittance. Accordingly, image analyzer 120 may calculate the transmittance of the light based on the luminances in captured image 115.

Meanwhile, captured image 115 of a white person's finger may have a higher luminance than captured image 115 of a black person's finger. That is, a skin color that is covering or pressing image sensor 110 may affect the luminance of captured image 115. Thus, in some embodiments, image analyzer 120 may compensate a transmittance based on the skin color of the user in order to more accurately calculate the transmittance.

In some embodiments, image analyzer 120 may analyze all pixels in captured image 115. In other embodiments, in order to reduce power consumption of device 100 and increase a processing speed of device 100, image analyzer 120 may analyze only a predetermined part of pixels from captured image 115 without analyzing the rest of the pixels.

Command mapper 130 may translate the transmittance into a command. By way of example, when the number of commands are three, (1) the transmittance<$t0$ may not be translated into a command; (2) $t0 \leq$ the transmittance<$t1$ may be translated into a command c1; (3) $t1 \leq$ the transmittance<$t2$ may be translated into a command c2; (4) t2 ≤the transmittance<t3 may be translated into a command c3; and (5) t3 ≤the transmittance may not be translated into a command. Various schemes may be adopted to translate the transmittance into a command. In some embodiments, a table that matches transmittances into a preset number of commands may be used.

In some embodiments, available commands in device 100 may vary depending on a kind of application that is activated on device 100. In one example, when a video reproduction application is reproducing video contents on device 100, the commands may include stopping or pausing the reproduction of the video contents. In another example, when a web browser application is activated on device 100, the commands may include taking a screenshot of a webpage opened by the web browser application. In still another example, if a video call application is executed, the commands may include inactivating a video camera. In still another example, the commands may include ending of an application that is being executed.

The commands may be preset by a manufacturer of device 100. Further, the commands may be programmable by a user of device 100. The user may add/edit/delete the commands through GUI of device 100 to improve user's conveniences.

Executor 140 may execute the command translated by the command mapper 130. Accordingly, the user can easily execute various commands on device 100 by pressing/covering/moving finger 10 on image sensor 110 of device 100.

Light emitter 150 may be mounted on device 100 near image sensor 110. When a user that holds device 100 is in a dark place, it may be difficult to calculate a transmittance from captured image 115 because a light reaching image sensor 110 is not sufficient. In such a case, light emitter 150 can be used as an external light source. Light emitter 150 may emit a flash light and, the flash light travels through finger 10 to image sensor 110. Light emitter 150 may be optional and can be omitted from device 100 in some embodiments.

Alternatively, a backlight unit of a display panel of device 100 may be used as an external light source instead of light emitter 150. That is, image sensor 110 may capture an image by using a light emitted from the backlight unit of the display panel of device 100. The backlight unit may include a CCFL (Cold Cathode Fluorescent Lamp), an ELP (Electroluminescent panel), a LED (Light Emitting Diode), and the like.

Image analyzer 120, command mapper 130 and executor 140 may be installed inside of device 100, and an arrangement of these components is not limited to the illustration of FIG. 1. Further, the number of image sensor 110 or light emitter 150 in FIG. 1 is not limited to one. By way of example, device 100 may further include a second image sensor mounted on the back face of device 100 and a second light emitter located near the second image sensor. If device 100 has multiple image sensors, inputs to the multiple image sensors may be translated into different commands by command mapper 130.

Although not depicted in FIG. 1, device 100 may further include an associated hardware circuitry and running software that can capture image 115 of finger 10 and analyze captured image 115 to calculate transmittance.

Figure 2A:
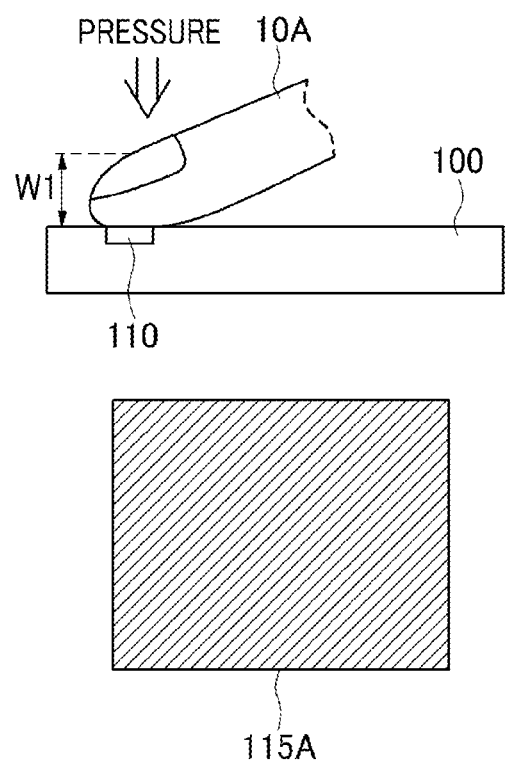

FIGS. 2A to 2B schematically show an illustrative example of captured images in accordance with at least some embodiments described herein. FIG. 2A shows a case where a finger 10A softly presses a front surface of image sensor 110 while FIG. 2B illustrates a case where a finger 10B strongly presses the front surface of image sensor 110.

If finger 10B applies a pressure stronger than finger 10A to image sensor 110, a fingertip of finger 10B becomes thinner than that of finger 10A because a human skin has elasticity. Accordingly, finger 10B has a thickness W2 that is thinner than a thickness W1 of finger 10A. In such a case, luminances of image 115A may be lower than luminances of image 115B because a pressure applied by finger 10A is lower than a pressure applied by finger 10B. Accordingly, a transmittance calculated from image 115A may be lower than a transmittance calculated from image 115A.

Therefore, the user may control device 100 in a different way by pressing image sensor 110 softly or strongly with his finger.

Figure 3:
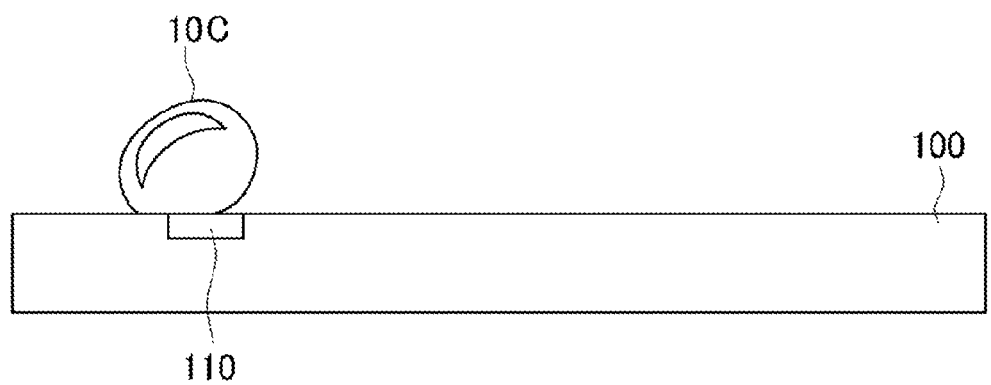
FIG. 3 schematically shows another illustrative example of a captured image in accordance with at least some embodiments described herein.
Figure 3:
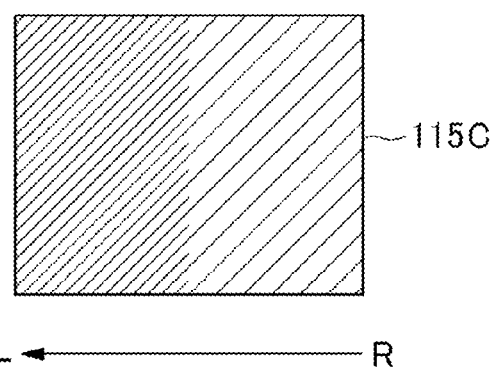

FIG. 3 schematically shows another illustrative example of a captured image in accordance with at least some embodiments described herein. As compared to FIG. 2, a finger 10C is tilted towards the left side of the drawing when pressing image sensor 110, so that finger 10C covers a part of image sensor 110.

Due to an inclination of finger 10C, from an image 115C captured by image sensor 110, pixels in a left area may have low luminances while pixels in a right area may have high luminances. Accordingly, in captured image 115C, a transmittance calculated from a pixel in the left area may be low, while a transmittance calculated from a pixel in the right area may be high.

On the contrary, if finger 10C is tilted towards the right side of the drawing, a transmittance calculated from a pixel in the left area may be high, while a transmittance calculated from a pixel in the right area may be low.

Accordingly, if finger 10C is tilted to one side, the transmittances in image 15C may have a distribution where pixels in one area may have a higher or lower transmittance than pixels in another area.

Command mapper 130 may select a command from among available commands based on the distribution of transmittances of captured image 115C. Therefore, the user may control device 100 in a different way by inclining finger 10C in a certain direction on image sensor 110.

Figure 4:
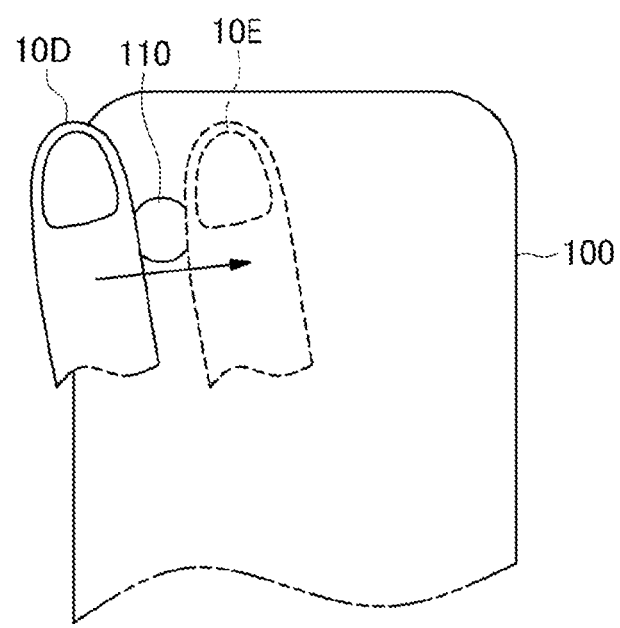
FIG. 4 schematically shows an illustrative example of a change between captured images in accordance with at least some embodiments described herein.
Figure 4:
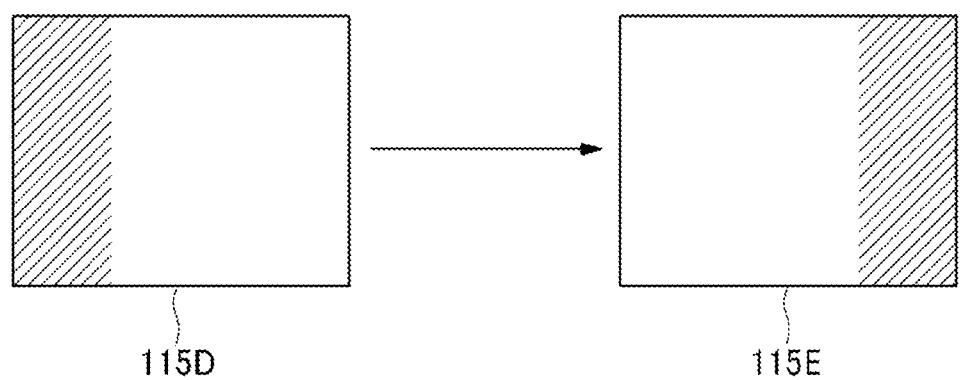

FIG. 4 schematically shows an illustrative example of a change between captured images in accordance with at least some embodiments described herein. As compared to FIG. 2 or FIG. 3, a finger shown in FIG. 4 does not stay at an initial position but moves from a first position of a finger 10D to a second position of a finger 10E. In this case, the finger may move across image sensor 110.

Image sensor 110 may capture a plurality of images regarding the finger while the finger moves across image sensor 110. In FIG. 4, image sensor 110 captures an image 115D of finger 10D at the first position and an image 115E of finger 10E at the second position.

Captured image 115D may show a luminance distribution where pixels in a left area have low luminances while pixels in a right area have high luminances. Similarly, captured image 115E may show a luminance distribution where pixels in a left area have high luminances while pixels in a right area have low luminances.

Image analyzer 120 may calculate each distribution of transmittances of the light based, at least in part, on each luminance distribution of images 115D and 115E. Then, image analyzer 120 may further calculate a change in distributions of transmittances of the light to detect a movement of the finger. In FIG. 4, image analyzer 120 may detect that an area corresponding to pixels having low transmittances move from the left area of image 115D to the right area of image 115E. Therefore, image analyzer 120 may determine that the finger moves from the left side to the right side across image sensor 110 based, at least in part, on the change in distributions of transmittances.

Command mapper 130 may translate the change in the distributions of transmittances into a command. Therefore, the user may control device 100 in a different way by moving the finger across image sensor 110 in a certain direction.

In some embodiments, the user may move the finger across image sensor 110 plural times in certain directions and device 100 may store, in a memory, a change in distributions of transmittances as a security pattern for device 100. Then, the user may unlock device 100 by moving the finger in the same way stored in the memory. Motion of the finger is not limited to moving across image sensor 110. By way of example, various motions such as tapping on image sensor 110 or changing a pressure applied on image sensor can be used as a security pattern.

Meanwhile, if the finger is used as the object for controlling device 100, there is a concern to be considered. Since blood periodically circulates through finger 10 due to a pulse, there may be a slight change in transmittances of finger 10 as time passes. Accordingly, while the user is putting the finger on image sensor 110, image analyzer 120 may detect a periodical change in transmittances. Therefore, image analyzer 120 may compensate the transmittance based, at least in part, on a pulse detected from the finger in order to prevent malfunction of device 100 caused by the pulse.

Figure 5A:
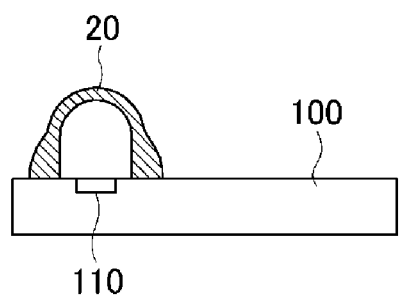
FIGS. 5A to 5C schematically show an illustrative example of an elastically deformable body in accordance with at least some embodiments described herein.
Figure 5B:
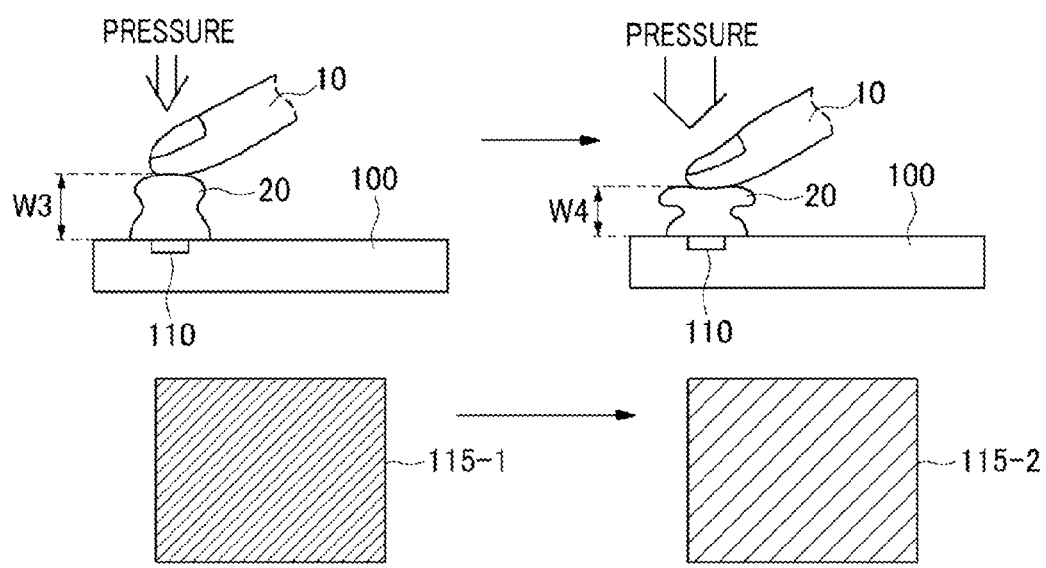
Figure 5C:
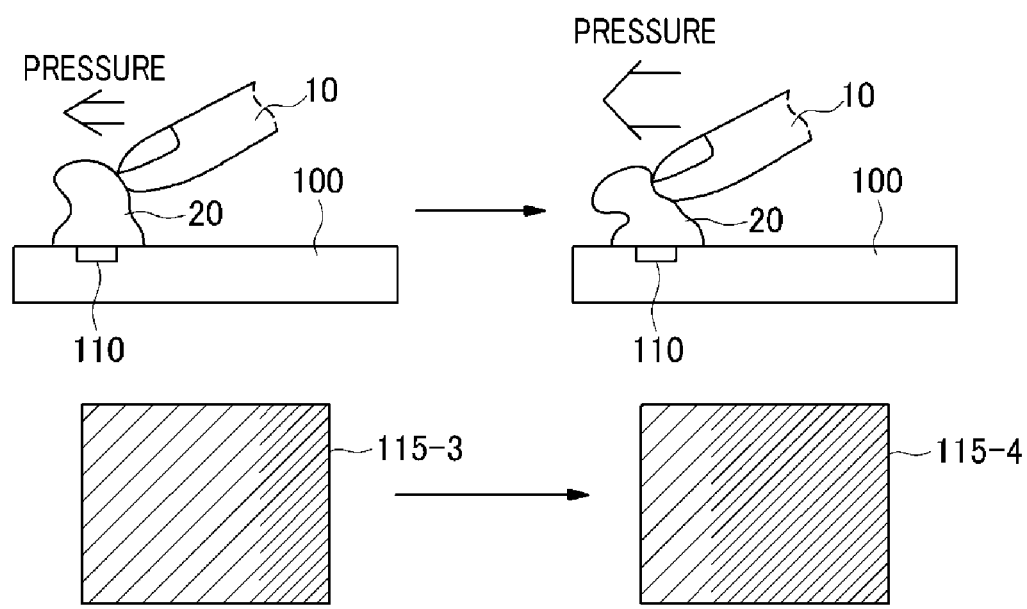

FIGS. 5A to 5C schematically show an illustrative example of an elastically deformable body in accordance with at least some embodiments described herein. As compared to FIG. 1, the user of device 100 does not use the finger but uses an elastically deformable body 20 made of a light-transmittable material in FIGS. 5A to 5C. Although elastically deformable body 20 covers image sensor 110, it can transmit a light therethrough. Therefore, elastically deformable body 20 may be used as an object for controlling device 100 instead of the finger.

If elastically deformable body 20 is used instead of the finger, it is possible to more accurately control device 100. Because elastically deformable body 20 covers image sensor 110, device 100 may not be affected by a background image.

FIG. 5A illustrates a cross section of elastically deformable body 20 that is attached on a surface of device 100 to cover image sensor 110, and a cross section of elastically deformable body 20 is shown as hatched. Although the inside of elastically deformable body 20 is illustrated as being empty, the inside of elastically deformable body 20 may be filled with a light-transmittable material.

FIG. 5B illustrates images 115-1 and 115-2 captured by image sensor 110 when different pressures are applied on elastically deformable body 20. A left drawing shows a case where finger 10 softly presses elastically deformable body 20 while a right drawing illustrates a case where finger 10 strongly presses elastically deformable body 20.

When the pressure applied to elastically deformable body 20 is getting stronger, elastically deformable body 20 becomes more compressed. Accordingly, a thickness W3 of elastically deformable body 20 is changed to a thickness W4. In such a case, a transmittance calculated from image 115-1 may be lower than a transmittance calculated from image 115-2.

FIG. 5C illustrates images 115-3 and 115-4 captured by image sensor 110 when different pressures are applied to elastically deformable body 20 toward the left side. A left drawing shows a case where finger 10 softly presses elastically deformable body 20 to the left side while a right drawing illustrates a case where finger 10 strongly presses elastically deformable body 20 to the left side.

Each of a captured image 115-3 and a captured image 115-4 shows a distribution of luminances. Accordingly, image analyzer 120 may calculate a distribution of transmittances based on the distribution of luminances.

When comparing captured image 115-3 with captured image 115-4, a part having a low luminance in captured image 115-4 is wider than a part having a low luminance in captured image 115-3. Accordingly, image analyzer 120 may detect a movement of finger 10 pressing elastically deformable body 20 by calculating a change in the calculated distributions of transmittances.

Figure 6:
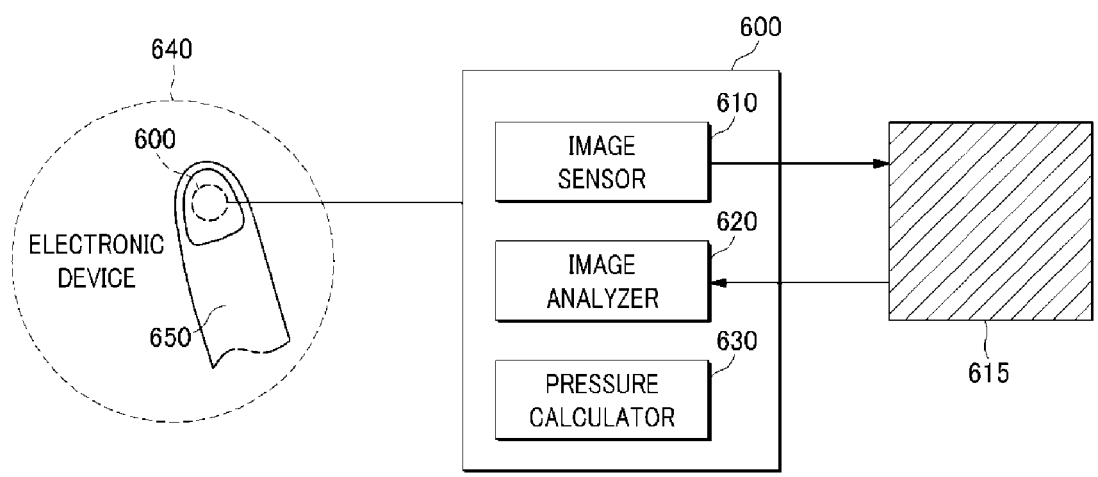
FIG. 6 shows a schematic block diagram illustrating an architecture of a pressure sensor in accordance with example embodiments described herein.

FIG. 6 shows a schematic block diagram illustrating an architecture of a pressure sensor in accordance with example embodiments described herein. As depicted in FIG. 6, a pressure sensor 600 may include an image sensor 610, an image analyzer 620, and a pressure calculator 630. Although illustrated as discrete components, various components may be divided into additional components, combined into fewer components, or eliminated altogether while being contemplated within the scope of the disclosed subject matter.

Image sensor 610 may capture an image 615 of a finger 650 that is in front of image sensor 610. In some embodiments, instead of using finger 650, a user may attach an elastically deformable body on a surface of an electronic device 640 and press down on the elastically deformable body. Image sensor 610 may capture multiple images of finger 650 or the elastically deformable body.

Image analyzer 620 may analyze captured image 615 to calculate a transmittance of a light that is transmitted from outside of finger 650 to image sensor 610 via finger 650 or a distribution of transmittances of the light. In order to calculate a transmittance of a light, image analyzer 620 may analyze luminances of captured image 615 since transmittances of the light is proportional to the luminance of captured image 615. If image sensor 610 captures multiple images, image analyzer 620 may analyze captured images 615 to calculate a change in distributions of transmittances of the light.

Pressure calculator 630 may calculate a pressure applied to finger 650 based, at least in part, on the transmittance, or determine a direction of the pressure based, at least in part, on the distribution of transmittances. Further, if image sensor 610 captures multiple images, pressure calculator 630 may determine a dynamic pattern of the pressure based, at least in part, on the change in distributions of transmittances.

By installing pressure sensor 600 on electronic device 640, typical electronic device 640 may perform functions including capturing image 615 of finger 650, analyzing captured image 615, and calculating the pressure applied to finger 650 as performed by device 100 of FIG. 1.

Figure 7:
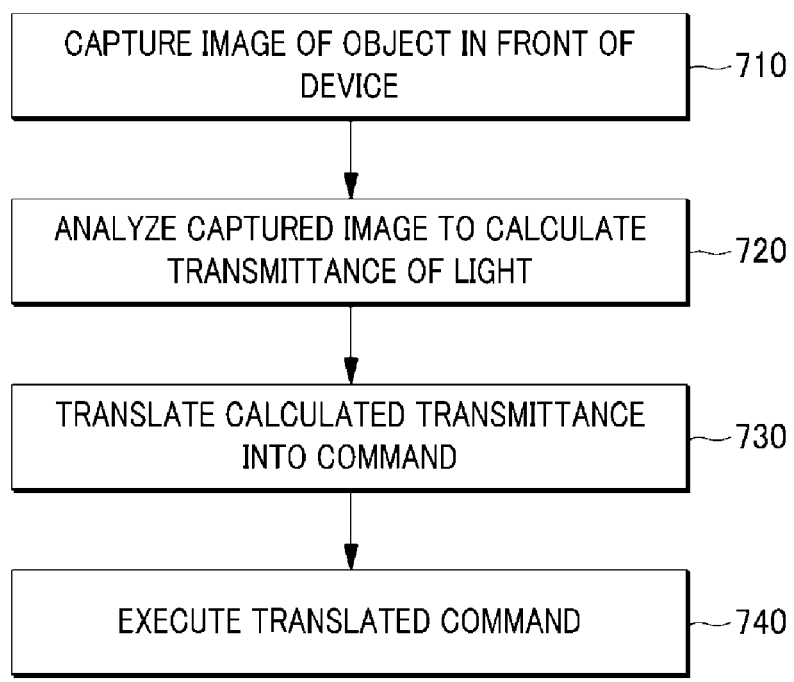
FIG. 7 shows an example process flow for controlling a device based on an image captured by an image sensor included in the device.

FIG. 7 shows an example process flow for controlling a device based on an image captured by an image sensor included in the device. The process flow in FIG. 7 may be implemented by at least one device or pressure sensor illustrated in FIGS. 1 to 6. Although illustrated as discrete blocks, various blocks may be divided into additional blocks, combined into fewer blocks, or eliminated, depending on the desired implementation. A process may begin at block 710.

At block 710 (Capture Image of Object), a device may capture an image of an object in front of the device. By way of example, the object may be a finger pressing a front surface of an image sensor or an elastically deformable body attached on a surface of the device to cover the image sensor. The process may proceed from block 710 to block 720.

At block 720 (Calculate Transmittance from captured Image), the device may analyze the captured image to calculate a transmittance of a light that travels through the object to the device. Further, the device may analyze the captured image to calculate a distribution of transmittances of the light or to detect a movement of the object by calculating a change in distributions of transmittances of the light. The process may proceed from block 720 to block 730.

At block 730 (Translate Transmittance into Command), the device may translate the transmittance into a command. In some embodiments, the commands may include at least one of unlocking of the device, stopping a function of the device, and turning up/down a volume of the device. Further, the command may be programmable by a user of the device. The process may proceed from block 730 to block 740.

At block 740 (Execute translated Command), the device may execute the command. That is, the user uses the image sensor as a user input interface, and, thus, the user can control the device without using a physical button or a touch screen of the device.

The examples described above, with regard to FIGS. 1-7, may be implemented in a computing environment having components that include, but are not limited to, one or more processors, system memory, and a system bus that couples various system components. Further, the computing environment may include a variety of computer readable media that are accessible by any of the various components, and includes both volatile and non-volatile media, removable and non-removable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, but not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal, such as carrier wave or other transport mechanism. Communication media also includes any information delivery media. The term modulated data signal means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

What is claimed is:

1. A device, comprising:
    an image sensor configured to capture an image of an object in front of the image sensor;
    an image analyzer configured to analyze the captured image to calculate a transmittance of a light that is transmitted from outside of the object to the image sensor via the object, the transmittance of the light being increased as a pressure that is applied to the object is increased;
    a command mapper configured to translate the transmittance into a command; and
    an executor configured to execute the command.

2. The device of claim 1, wherein the image analyzer is further configured to analyze the captured image to calculate a distribution of transmittances of the light, and
    the command mapper is further configured to translate the distribution of transmittances into a command.

3. The device of claim 1, wherein the image sensor is further configured to capture a plurality of images of the object,
    the image analyzer is further configured to analyze the captured images to detect a movement of the object by calculating a change in distributions of transmittances of the light, and
    the command mapper is further configured to translate the change in the distributions of transmittances into a command.

4. The device of claim 1, wherein the object is a finger pressing a front surface of the image sensor.

5. The device of claim 4, wherein the image analyzer is further configured to compensate the transmittance based, at least in part, on a pulse detected from the finger.

6. The device of claim 1, wherein the object is an elastically deformable body that is attached on a surface of the device to cover the image sensor.

7. The device of claim 1, wherein the image analyzer is further configured to analyze a predetermined part of pixels from the captured image without analyzing the rest pixels from the captured image.

8. The device of claim 1, wherein the image sensor is further configured to capture the image of the object at regular time intervals.

9. The device of claim 1, wherein the image analyzer is further configured to compensate the transmittance based, at least in part, on a color of the object.

10. The device of claim 1, wherein the command comprises at least one of unlocking of the device, stopping a function of the device and turning up/down volume of the device.

11. The device of claim 1, wherein the command is programmable by a user of the device.

12. The device of claim 1, further comprising:
a light emitter configured to emit the light that travels through the object.

13. The device of claim 1, wherein the light is emitted from a display of the device.

14. A pressure sensor, comprising:
an image sensor configured to capture an image of an object in front of the image sensor;
an image analyzer configured to analyze the captured image to calculate a transmittance of a light that is transmitted from outside of the object to the image sensor via the object, the transmittance of the light being increased as a pressure that is applied to the object is increased; and
a pressure calculator configured to calculate the pressure applied to the object based, at least in part, on the transmittance.

15. The pressure sensor of claim 14, wherein the image analyzer is further configured to analyze the captured image to calculate a distribution of transmittances of the light, and
the pressure calculator is further configured to determine a direction of the pressure based, at least in part, on the distribution of transmittances.

16. The pressure sensor of claim 14, wherein the image sensor is further configured to capture a plurality of images of the object,
the image analyzer is further configured to analyze the captured images to calculate a change in distributions of transmittances of the light, and
the pressure calculator is further configured to determine a dynamic pattern of the pressure based, at least in part, on the change in distributions of transmittances.

17. The pressure sensor of claim 14, wherein the image analyzer is further configured to analyze a predetermined part of pixels from the captured image without analyzing the rest pixels from the captured image.

18. The pressure sensor of claim 14, wherein the image sensor is further configured to capture the image of the object at regular time intervals.

19. A method performed by a device, comprising:
capturing an image of an object in front of the device;
analyzing the captured image to calculate a transmittance of a light that travels through the object to the device, the transmittance of the light being increased as a pressure that is applied to the object is increased;
translating the transmittance into a command; and
executing the command.

20. A non-transitory computer-readable storage medium having stored thereon computer-executable instructions that, in response to execution, cause a device to perform a method as claimed in claim 19.

* * * * *